United States Patent
Mayr et al.

(10) Patent No.: US 6,989,729 B2
(45) Date of Patent: Jan. 24, 2006

(54) PROPORTIONAL PRESSURE CONTROL VALVE FOR CONTROLLING THE PRESSURE LEVEL IN A HYDRAULIC CIRCUIT

(75) Inventors: Karlheinz Mayr, Br genz (AT); Thilo Schmidt, Meckenbeuren (DE)

(73) Assignee: ZF Friedrichshafen AG, Friedrichshafen (DE)

(*) Notice: Subject to any disclaimer, the term of this patent is extended or adjusted under 35 U.S.C. 154(b) by 0 days.

(21) Appl. No.: 10/688,336

(22) Filed: Oct. 17, 2003

(65) Prior Publication Data

US 2004/0130421 A1 Jul. 8, 2004

(30) Foreign Application Priority Data

Nov. 28, 2002 (DE) .......................................... 102 55 414

(51) Int. Cl.
*H01F 7/08* (2006.01)

(52) U.S. Cl. .................... 335/220; 251/129.15; 251/281
(58) Field of Classification Search ......... 335/220–229, 335/261–262, 281–282; 251/129.01–15, 251/129.1–129.19; 123/90.11
See application file for complete search history.

(56) References Cited

U.S. PATENT DOCUMENTS

| | | | | |
|---|---|---|---|---|
| 3,791,408 A | * | 2/1974 | Saitou et al. ................ | 137/529 |
| 4,369,419 A | | 1/1983 | Portscheller ................. | 335/255 |
| 5,056,556 A | * | 10/1991 | Nishimoto et al. ......... | 137/522 |

FOREIGN PATENT DOCUMENTS

| | | |
|---|---|---|
| DE | 41 32 931 A1 | 4/1993 |
| DE | 41 32 931 | 4/1993 |
| DE | 299 12 431 U1 | 10/1999 |
| DE | 299 12 431 | 10/1999 |
| DE | 100 03 696 | 8/2001 |
| DE | 100 03 896 A1 | 8/2001 |
| DE | 100 34 959 | 2/2002 |
| DE | 100 34 959 A1 | 2/2002 |
| DE | 102 44 527 | 4/2004 |
| WO | 98/48332 | 10/1998 |
| WO | 98148332 | 10/1998 |

* cited by examiner

*Primary Examiner*—Lincoln Donovan
(74) *Attorney, Agent, or Firm*—Davis & Bujold, P.L.L.C.

(57) ABSTRACT

A proportional pressure control valve (1) for controlling the pressure level in a hydraulic circuit having a push rod (5) as a connection between a control element (13) arranged in the hydraulic circuit and a proportional magnet located in a housing (10), which comprises a magnetic core (2), a magnetic anchor (3), and a magnetic coil (4), the magnetic coil (4) and the magnetic core (2) are securely connected to the housing (10), and the magnetic anchor (3) can be moved axially back and forth between two end positions by means of a magnetic force. At least one part of the magnetic anchor (3, 3") is arranged so as to be movable relative to the anchor rod (6) in dependence upon the magnetic flow, so that in this way either the gaps (11, 14) are enlarged and/or an additional second gap (8) is produced.

7 Claims, 4 Drawing Sheets

PROPORTIONAL PRESSURE CONTROL VALVE FOR CONTROLLING THE PRESSURE LEVEL IN A HYDRAULIC CIRCUIT

This application claims priority from German Application Serial No. 102 55 414.5 filed Nov. 28, 2002.

FIELD OF THE INVENTION

The invention concerns a proportional pressure control valve.

BACKGROUND OF THE INVENTION

According to the state of the art, the pressure in a hydraulic circuit is controlled according to need in a gearbox, especially in an automatic gearbox for a motor vehicle. While the pressure level in the hydraulic circuit for the lubricating oil supply of the gearbox components can be kept low, the pressure must be strongly increased during shifting operations, for example, to be able to fill the control elements rapidly.

To control the pressure in the hydraulic circuits, pressure controllers that regulate downstream check valves for the clutch operation are normally used. Control of the downstream check valves takes place within the pressure controller by means of a proportional magnet that consists, among other things, of a magnetic core, a magnetic coil, and a magnetic anchor. The coil flow is controlled in proportion with the output variable force by means of the proportional magnet; the magnetic anchor, and hence the downstream check valves, are controlled in accordance with the coil flow. From the characteristic magnetic force flow curve of the pressure controller resulting therefrom are generated the pressure flow curves (P/I-curves) desired for the clutch adaptation in an electrohydraulic control of automatic gearboxes.

From the German patent application DE 100 34 959 A1 of the applicant is known a proportional pressure control valve having a valve part with inlet and outlet openings and at least one closing mechanism for controlling an opening, as well as a magnetic part with a magnetic core, a magnetic coil, and a magnetic anchor arranged to be displaceable. The anchor coacts herein with an actuating element that actuates the spherical closing mechanism. In addition, the hydraulically acting cross section of the opening is determined essentially by the opening length, the opening diameter, and the diameter of the part of the actuating element that penetrates into the opening, wherein the ratio of opening length to opening diameter is less than 2.0.

Another proportional pressure control valve is known from WO 98/48332 of the applicant. It has at least two opening phases, wherein two phases are variable and mutually coupled by mechanical or hydraulic action according to the hydraulic half bridge principle and are provided as inlet and outlet openings of a control pressure chamber.

From DE 100 03 896 A1 of the applicant is also known a pressure controller, which adjusts a downstream check valve according to need by means of a fixed proportional magnet, a magnetic coil, a movable magnetic anchor, and a specific control system and controls in this way the pressure in the hydraulic circuit. Initially, the characteristic pressure flow curve has a continuously rising gradient. In practice, however, the gradient at the onset of the pressure flow curve is very high for the operational requirements, so that the pressure flow sensitivity of the pressure control needs improvement for the gear change requirements. An increase in the shifting quality can effect an improvement in sensitivity, in particular at a low load, that is, at low pressures.

To improve shifting quality, the applicant has proposed within the scope of DE 102 44 527 to realize a load-dependent adaptation of the P/I-curve of a proportional pressure control valve by means of a proportional magnet with two mutually independent controllable gaps. Accordingly, the first gap part is a plunging phase known from the state of the art that is controlled by means of an induced magnetic field. This magnetic field is generated by an electric current in the magnetic coil and runs over the magnetic anchor, the housing, and the magnetic core located in the interior of the magnetic coil.

Within the scope of the solution described in DE 102 44 527 is provided an axial separation between the magnetic anchor and the magnetic core by means of a non-magnetic non-stick disc in such a way that the magnetic field can project beyond a gap of the magnetic anchor. At this point, the magnetic field generates a magnetic force that acts on the magnetic anchor and moves the same in an axial direction in accordance with the magnetic force. This makes possible continuous control of the magnetic anchor, or of a control element connected to the magnetic anchor, via an anchor rod by means of continuous electric activation of the proportional magnet or the magnetic coil. Furthermore, a targeted weakening of the magnetic field can be achieved by means of a second gap. The second gap is realized by using a magnetic core that consists of at least two parts, wherein a first part is securely connected to the housing and arranged so that is concentrically and axially displaceable around the anchor rod, which is securely connected to the magnetic anchor. The second part of the magnetic core is arranged to be coaxially, concentrically, and axially displaceable around the anchor rod, and in contrast to the first part, is configured to be axially movable, so that an adjustment of the gap between the two magnetic core parts is made possible. This means that the magnetic resistance dependent from the gap width can be controlled so that the gradient of the P/I-curve is lower in particular with low current values than in comparable solutions, but is still not optimal.

In all the solutions according to the state of the art, the gradient of the P/I-curve is relatively steep, especially at lower current values, so that improvements of the shifting comfort can be achieved.

It is an object of the invention to disclose a proportional pressure control valve for controlling the pressure level in a hydraulic circuit, especially in a hydraulic circuit of a gearbox of a motor vehicle, which improves upon the state of the art. Especially the P/I-curve should have a very flat rising gradient or a high pressure/current resolution in part at low current values.

This object is attained by means of a proportional pressure control valve.

SUMMARY OF THE INVENTION

Accordingly, a proportional pressure control valve is provided with a push rod as the connection between a control element arranged in the hydraulic circuit and a proportional magnet that comprises a housing, a magnetic core, a magnetic anchor, and a magnetic coil, wherein the magnetic coil and the magnetic core are securely connected to the housing, and the magnetic anchor can be moved axially back and forth between two end positions in the interior of the magnetic coil by means of a magnetic force within the greatest possible magnetically acting gap between the front face of the magnetic anchor and the magnetic core, in which at least one part of the magnetic anchor is arranged to be movable along the anchor rod in dependence upon the magnetic flow, so that either the previously mentioned gap is enlarged and/or an additional second gap is produced.

Within the scope of a first preferred design, the proportional pressure control valve of the invention has an anchor that is preferably preloaded by spring force, which is moved on the anchor rod, in which a gap provided between the magnetic anchor and the magnetic core is correspondingly reduced at high current values to supply the same pressure value at maximum current as the controller according to the state of the art. In this way, a soft startup of the P/I-curve is achieved, so that the pressure/current solution is increased within the low current range by means of a curve gradient that is flat in part.

Another preferred design is provided according to the invention, in which the magnetic anchor has at least two magnetic anchor parts, wherein a first part is securely connected to the anchoring rod and a second part is arranged to be axially displaceable on the anchoring rod. According to the invention, the two parts are interconnected by means of an elastic element, preferably a spring. In this connection, the second part of the magnetic anchor is preloaded against the force of the elastic element or spring, so that the anchor part is moved against the force of the spring during another increase of the current or magnetic flow, whereupon the gap between the two anchor parts is reduced.

Within the scope of another design, it is provided that the anchor consists of at least two parts arranged to be movable along the anchor rod, so that a first gap is provided between the magnetic core and a first anchor part and a second gap is provided between the anchor parts. The gaps are produced by using a spring or an elastic element between the adjacent parts, while in this case springs with different elasticity are advantageously used, so that the size of the gap can be precisely controlled in dependence upon the current.

BRIEF DESCRIPTION OF THE DRAWINGS

The invention will now be described, by way of example, with reference to the accompanying drawings, in which.

DETAILED DESCRIPTION OF THE INVENTION

Figure 1:
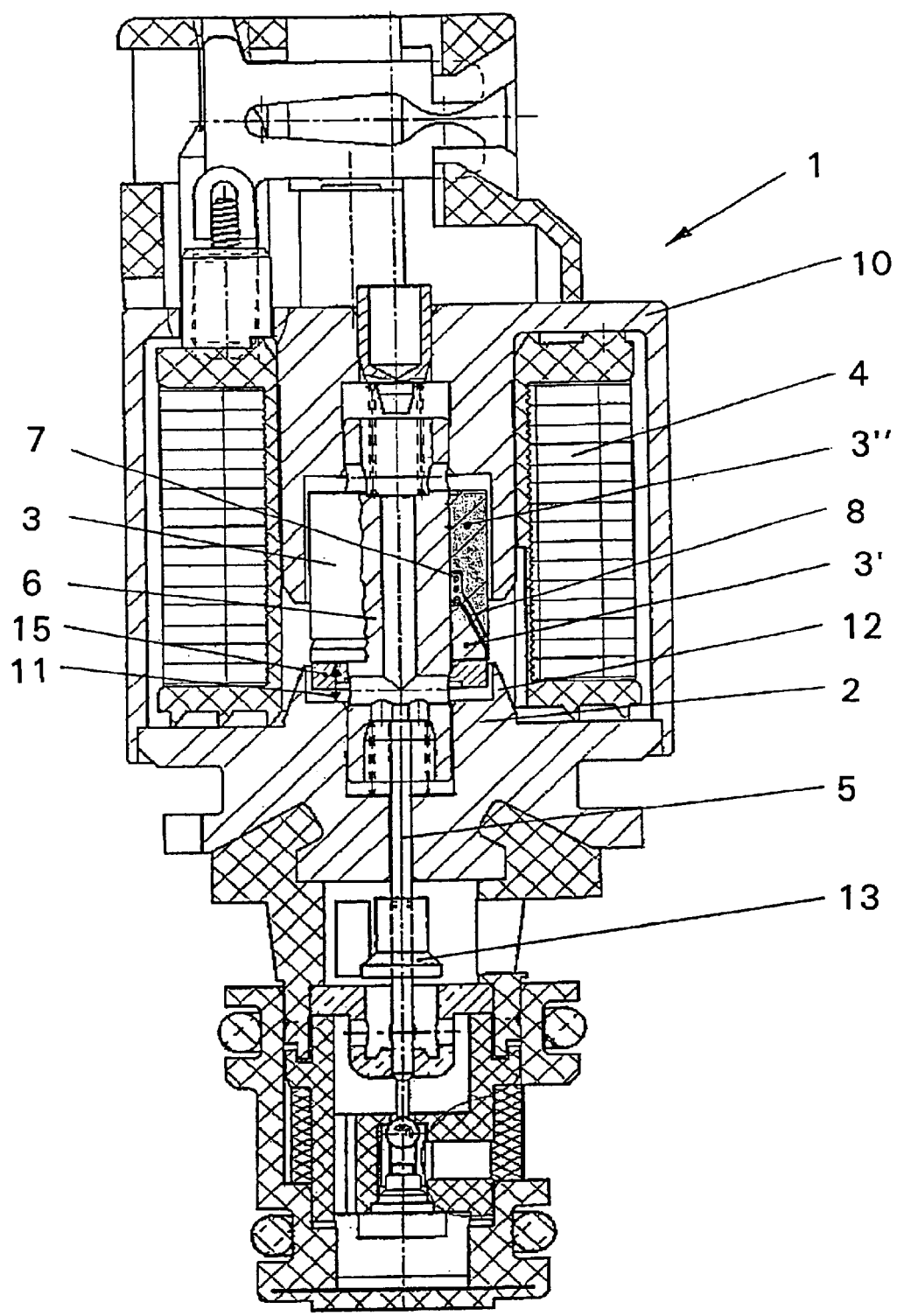
FIG. 1 shows a longitudinal section through a proportional pressure control valve according to a first design of the invention.

According to FIG. 1, a proportional pressure control valve 1 for controlling the pressure level in a hydraulic circuit according to the invention comprises a proportional magnet with a housing 10, a magnetic core 2, a magnetic coil 4, and a magnetic anchor 3, which is connected to a push rod 5, and a non-magnetic non-stick disc 15, which is provided on the front face of the magnetic anchor 3 facing toward the magnetic core 2, while the push rod 5 is connected at one end to a control element 13 arranged in the hydraulic circuit. The magnetic coil 4 and the magnetic core 2 are securely connected to the housing 10; the magnetic core 2 has a circulating magnetic control edge 12, the magnetic anchor 3 can be moved axially back and forth between two end positions within the interior of the magnetic coil 4 by means of a magnetic force existing between the magnetic anchor 3 and the magnetic core 2, and, as a consequence, this has an actuation of the control elements 13. The gap 11 is subsequently defined as the greatest possible magnetically acting gap or space between the opposite front face of the magnetic core 2 and the magnetic anchor 3; the space between the non-stick disc 15 and the magnetic core 2 is still not taken into consideration because of the non-magnetic properties of the disc 15. The front face of the magnetic anchor 3, 3' or the front face of the non-stick disc 15 can be located in the end position in which the greatest possible magnetically-acting gap 11, 14 appears inside as well as outside of the magnetic control edge 12.

According to a first design of the invention, the magnetic anchor 3 has at least two magnetic anchor parts 3', 3", wherein a first part 3' is securely connected to the anchor rod 6, and a second part 3" is arranged to be axially displaceable on the anchor rod 6.

According to the invention, both parts 3', 3" are interconnected by means of an electric element, preferably a spring 7. The second part 3" of the magnetic anchor 3 is herein preloaded against the force of the elastic element or the spring 7, so that the anchor part 3" is moved against the force of the spring 7 during another magnetic flow increase, whereupon the gap 8 between the two parts 3', 3" is reduced, or is closed starting at a threshold value. After the closing of the gap 8 or in dependence upon the gap size, the gradient of the P/I-curve rises steeply; at low current values is achieved an optimal solution because of the progressive very flat gradient of the curve.

Figure 2:
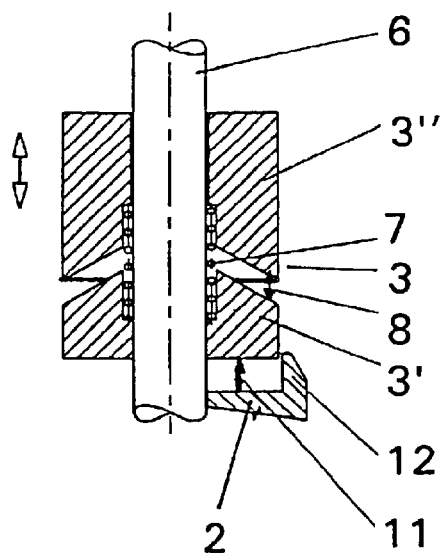
FIG. 2 shows a schematic of a first design of a magnetic anchor of a proportional pressure control valve of the invention.
Figure 2A:
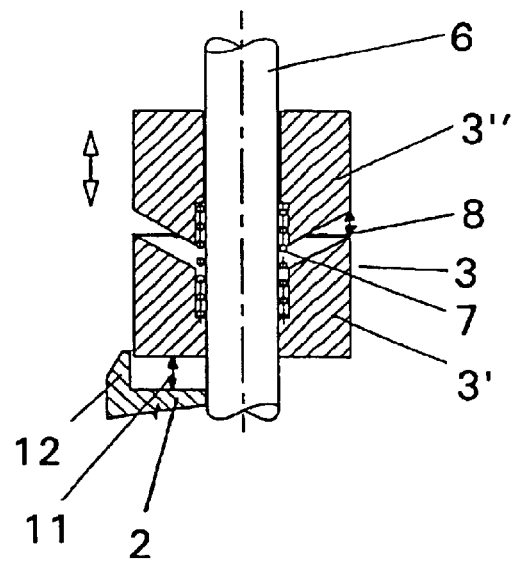
FIG. 2A shows a schematic of a second design of a magnetic anchor of a proportional pressure control valve of the invention.

In FIGS. 2 and 2A are shown two exemplary designs of a split magnetic anchor 3 of a proportional pressure control or proportional pressure control valve 1. The magnetic anchor 3 shown in FIG. 2 corresponds to the magnetic anchor of FIG. 1; the magnetic anchor 3 shown in FIG. 2A is partitioned differently, but contains also a movable part 3" and a fixed part 3' arranged securely on the anchor rod 6. The non-stick disc as described above is not shown for reasons of simplification.

Figure 3:
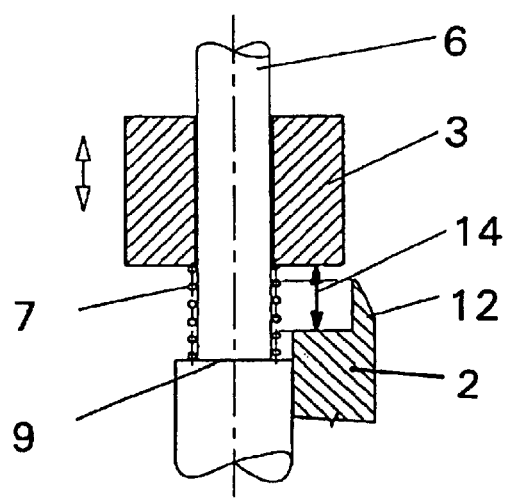
FIG. 3 shows a schematic of another design of a magnetic anchor of a proportional pressure control valve of the invention.

The object of FIG. 3 is a particularly advantageous design of the invention in which the magnetic anchor 3 is arranged to be axially displaceable as a unit in dependence upon the magnetic flow along the anchor rod 6 against the force of an elastic element or a spring 7. Herewith, the spring 7 can be supported, for example, on an anchor rod collar 9. Also in this case, the gap 14 that is produced between the front faces of the magnetic anchor 3 and the magnetic core 2 can be reduced in dependence upon the current, but not completely closed, which results in a very flat P/I-curve within the low current range.

Figure 4:
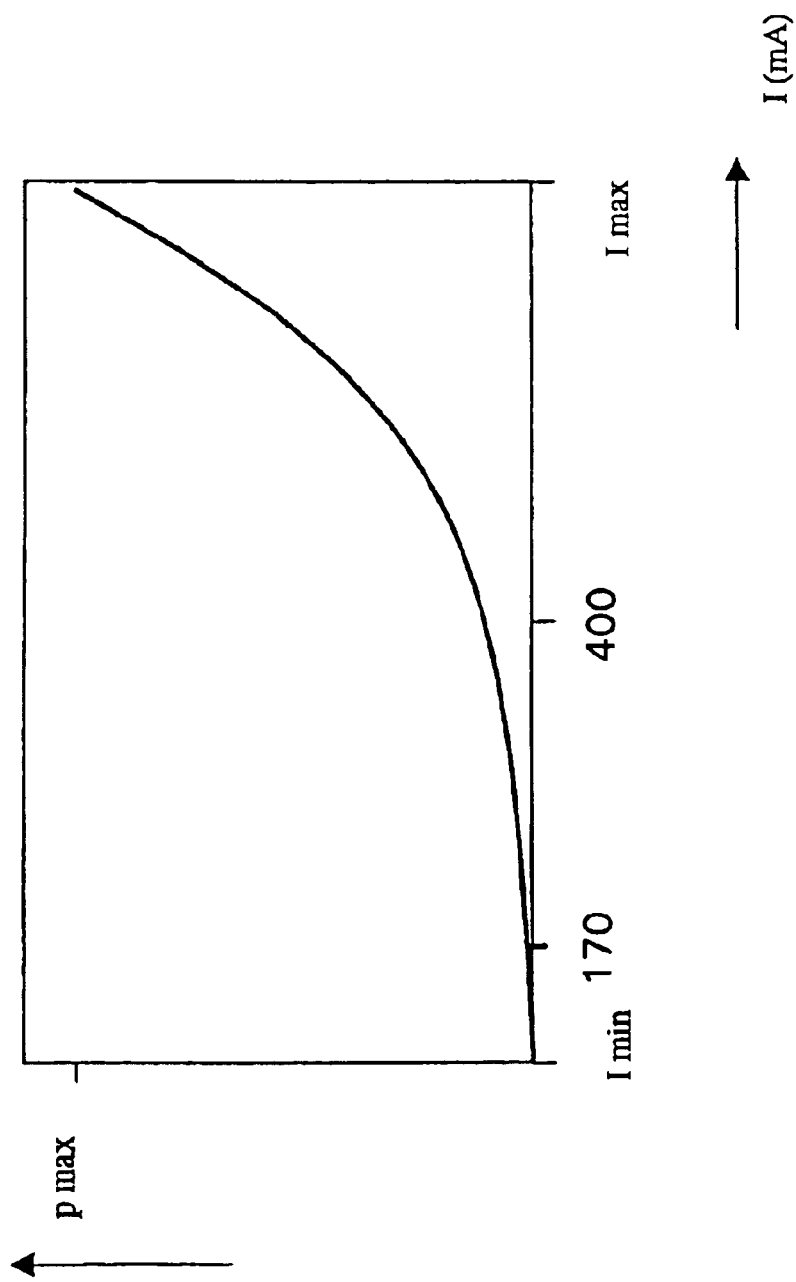
FIG. 4 shows a depiction of the progressive P/I-curve, which can be obtained by means of the proportional pressure control valve of the invention.
Figure 5:
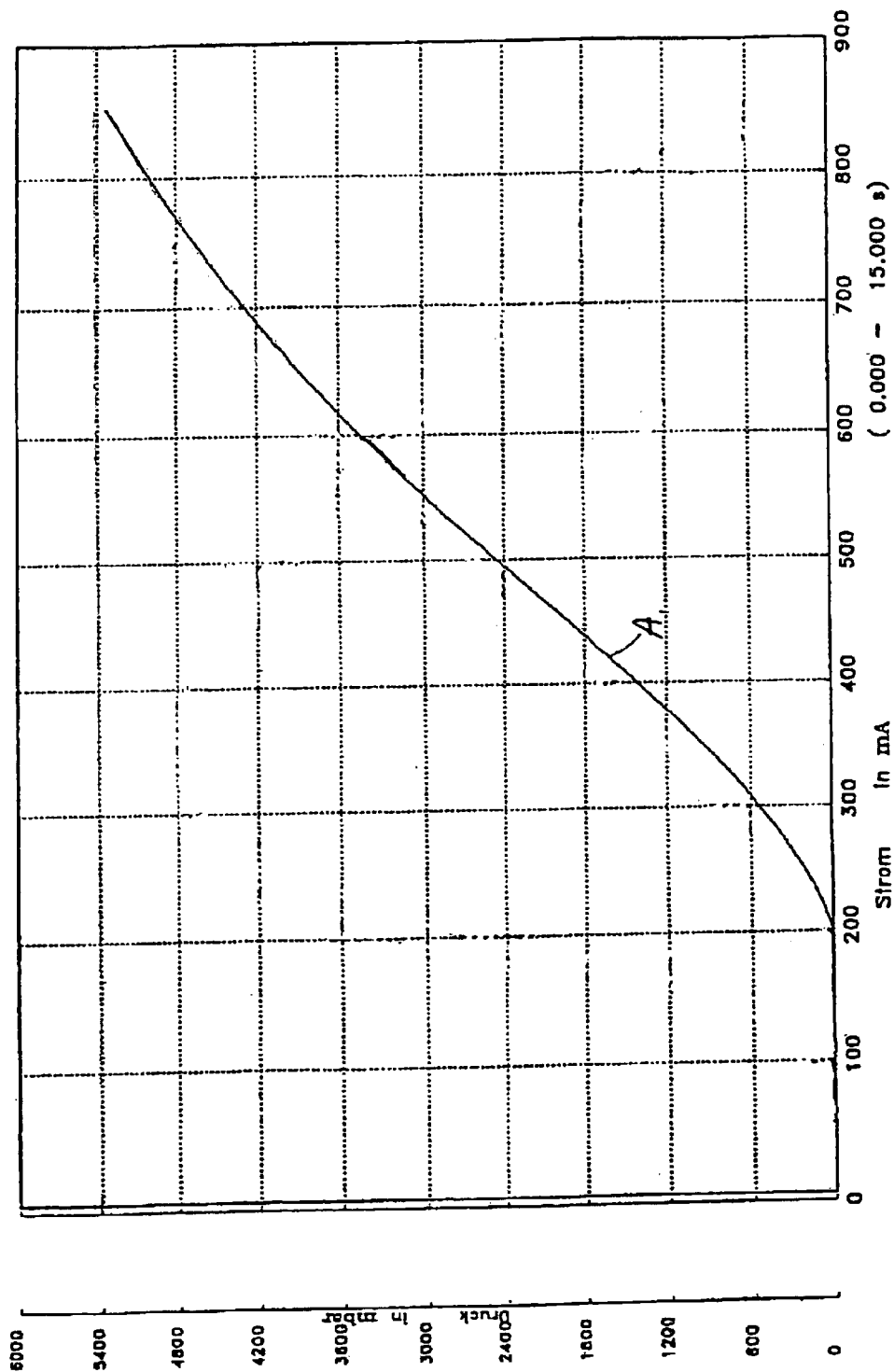
FIG. 5 shows a depiction of a P/I-curve of a proportional pressure control valve according to the state of the art.

By means of the concept of the invention can be realized a P/I-curve according to FIG. 4. This curve has a progressive gradient with a very flat rising gradient within the low current range. A typical onset current value, in which a first pressure increase can be visible, is within an order of magnitude of approx. 170 mA for a proportional pressure control of the invention; the value can be varied, however, in dependence upon the spring constants and the desired curve gradient.

Exemplary values for the increase of the P/I-curve in the low current range within the interval I_min of up to 400 mA are 0 to 0.4 bar/A; in addition, the values increase up to 16.0 bar/A. The difference of the P/I-curve realized by the invention according to FIG. 4 with respect to the corresponding curve of a pressure control of the state of the art is elucidated by means of a comparison with the curve (curve A) of the state of the art. The rising gradient of the P/I-curve of the state of the art over the entire current interval usually amounts to 3 to up to 10 bar/A.

Eventual curve deviations can be compensated according to the invention by means of strip end calibration or by adaptation during the operation.

REFERENCE NUMERALS

1 Proportional pressure control valve
2 Magnetic core
3 Magnetic anchor
3' Magnetic anchor part
3" Magnetic anchor part
4 Magnetic anchor coil
5 Push rod
6 Anchor rod
7 Spring
8 Gap
9 Anchor rod collar
10 Housing
11 Gap
12 Magnetic control edge
13 Control element
14 Enlarged gap
15 Non-stick disc

What is claimed is:

1. A proportional pressure control valve (1), for controlling a pressure level in a hydraulic circuit, comprising:
 a push rod (5) connected between a control element (13), arranged in the hydraulic circuit, and a proportional magnet, located in a housing (10), the proportional magnet comprises a magnetic core (2), a magnetic anchor (3), and a magnetic coil (4);
 wherein the magnetic coil (4) and the magnetic core (2) are securely connected to the housing (10);
 the magnetic anchor (3) includes a first part securely connected with an axial anchor rod (6);
 the push rod (5) couples the first part of the magnetic anchor (3) to the control element (13);
 the magnetic core (2) has a magnetic control edge (12) and the first part of the magnetic anchor (3) is axially movable back and forth relative to the magnetic core (2) between opposed first and second end positions by magnetic force for controlling actuation of the control element (13);
 a width of a magnetically acting gap (11), formed between front faces of the magnetic core (2) and the first part of the magnetic anchor (3), is adjusted to a maximum possible value by movement of the first part of the magnetic anchor (3), via the magnetic force, toward the second end position; and
 a second part of the magnetic anchor (3") is arranged to be movable relative to the anchor rod (6) in dependence upon the magnetic force so that one of a first gap (14), which is enlarged with respect to the magnetically acting gap (11), and an additional second gap (8) is produced.

2. A proportional pressure control valve (1), for controlling a pressure level in a hydraulic circuit, comprising:
 a control element (13) arranged in the hydraulic circuit;
 a proportional magnet located in a housing (10), the proportional magnet including a magnetic core (2), a magnetic anchor (3), and a magnetic coil (4);
 wherein the magnetic coil (4) and the magnetic care (2) are securely connected to the housing (10);
 the magnetic anchor (3) is located coaxially within the magnetic coil (4) and includes a first part securely connected to an axial anchor rod (6);
 the magnetic core (2) is located adjacent the magnetic coil (4) and includes a magnetic control edge (12) located adjacent an end of the first part of the magnetic anchor (3);
 a magnetically acting gap (11) is formed between the magnetic core (2) and the first part of the magnetic anchor (3);
 the first part of the magnetic anchor (3) is axially movable with the anchor rod (6) between a first end position, located adjacent the magnetic core (2), and a second end position, spaced from the magnetic core (2), by a magnetic force generated by the magnetic coil (4); and
 the first part of the magnetic anchor (3) is coupled to the control element (13) by a push rod (5); whereby
 the control element (13) is actuated by movement of the first part of the magnetic anchor (3) due to the magnetic force; and
 a width of the magnetically acting gap, between the magnetic core (2) and the first part of the magnetic anchor (3), is adjusted to a maximum possible value by movement of the first part of the magnetic anchor (3) toward the second end position;
 the magnetic anchor (3) further includes a second part that axially displaceable along the axial anchor rod (6); and
 a width of a second gap (8), formed between the first and second parts of the magnetic anchor (3), is adjustable against a force of one of an elastic element and a spring (7) by movement of the second part of the magnetic anchor (3) along the anchor rod (6) due to the magnetic force.

3. The proportional pressure control valve (1) of claim 2, wherein the spring (7) is supported on an anchor rod collar (9).

4. The proportional pressure control valve (1) of claim 1, wherein the second part (3") is arranged so as to be axially displaceable along the anchor rod (6) so that the second gap (8) is produced between the first and second parts (3', 3") of the magnetic anchor (3), and a width of the second gap (8) is adjusted against a force of an elastic element or a spring (7), located between the first and second parts (3', 3") of the magnetic anchor (3), depending upon the magnetic flow.

5. The proportional pressure control valve (1) of claim 1, wherein the P/I-curve of the proportional pressure control valve (1) has a gradient which varies with current strength of the proportional magnet.

6. A proportional pressure control valve (1), for controlling a pressure level in a hydraulic circuit, comprising:
 a push rod (5) connected between a control element (13), arranged in the hydraulic circuit, and a proportional magnet, located in a housing (10); and the proportional magnet comprises a magnetic core (2), a magnetic anchor (3), and a magnetic coil (4);
 wherein the magnetic coil (4) and the magnetic core (2) are securely connected to the housing (10);

the magnetic anchor (3) includes a first part securely connected with an axial anchor rod (6);

the push rod (5) couples the first part of the magnetic anchor (3) to the control element (13);

the magnetic core (2) has a magnetic control edge (12) and the first part of the magnetic anchor (3) is axially movable back and forth relative to the magnetic core (2) between first and second end positions by magnetic force for controlling actuation of the control element (13);

a width of a magnetically acting gap (11), formed between front faces of the magnetic core (2) and the first part of the magnetic anchor (3), is adjusted to a maximum possible value by movement of the first part of the magnetic anchor (3), via the magnetic force, toward the second end position; and a second part of the magnetic anchor (3") is arranged to be movable relative to the anchor rod (6) in dependence upon the magnetic force so that one of a first gap (14), which is enlarged with respect to the magnetically acting gap (11), and an additional second gap (8) is produced; and the gradient of the P/I-curve has a very flat rising gradient within a low current range and a steep rising gradient within a range having mid to high current strength.

7. The proportional pressure control valve (1) of claim 6, wherein the steep rising gradient of the P/I-curve in a first half of an overall current interval amounts to approximately 4.0 bar/A and in a second half the overall current interval amounts approximately up to 16 bar/A.

* * * * *